US008659982B2

United States Patent
Mikami et al.

(10) Patent No.: US 8,659,982 B2
(45) Date of Patent: Feb. 25, 2014

(54) OPTICAL INFORMATION RECORDING/REPRODUCING APPARATUS AND OPTICAL INFORMATION REPRODUCING APPARATUS

(75) Inventors: Hideharu Mikami, Kawasaki (JP);
Harukazu Miyamoto, Higashimurayama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 264 days.

(21) Appl. No.: 12/961,571

(22) Filed: Dec. 7, 2010

(65) Prior Publication Data

US 2011/0141867 A1  Jun. 16, 2011

(30) Foreign Application Priority Data

Dec. 15, 2009  (JP) ................................. 2009-283578

(51) Int. Cl.
| G11B 20/00 | (2006.01) |
| G11B 7/00 | (2006.01) |
| G11B 7/135 | (2012.01) |
| G11B 27/36 | (2006.01) |

(52) U.S. Cl.
USPC ............. 369/47.19; 369/103; 369/112.1; 369/112.15; 369/124.12; 369/124.15; 369/44.41; 369/53.22; 369/53.27; 369/124.04; 369/124.14

(58) Field of Classification Search
USPC ......... 369/47.19, 103, 112.1, 112.15, 124.12, 369/124.15, 44.41, 53.22, 53.27, 124.04, 369/124.14
See application file for complete search history.

(56) References Cited

U.S. PATENT DOCUMENTS

| 2004/0027968 A1* | 2/2004 | Horimai .................. 369/103 |
| 2007/0274171 A1 | 11/2007 | Shimano et al. |
| 2008/0067321 A1 | 3/2008 | Miyamoto et al. |

(Continued)

FOREIGN PATENT DOCUMENTS

| CA | 1212762 | 10/1986 |
| JP | 58215735 | 12/1983 |

(Continued)

OTHER PUBLICATIONS

McLeod et al., "Microholographic Multilayer Optical Disk Data Storage," Applied Optics, 2005, p. 3197-3207, vol. 44, No. 16, Jun. 1, 2005.

(Continued)

*Primary Examiner* — Aneeta Yodichkas
(74) *Attorney, Agent, or Firm* — Antonelli, Terry, Stout & Kraus, LLP.

(57) ABSTRACT

In a system of detecting an interference light with a light not irradiated onto an optical disc to increase the S/N ratio, it is difficult to stably acquire a reproduced signal with a simple configuration. Since the recording density is not improved, an improvement in transfer rate is difficult. In an optical information recording/reproducing apparatus where two optical beams face each other and are focused at the same place of a recording medium to record a standing wave developed by interference of the two optical beams, a phase difference of the two optical beams is modulated in a multiple stage and recorded. During reproduction, an interference light of a reproduced light from the recording medium and another reproduction reference light is detected as a reproduced signal, and a phase servo control stabilizing the phase of interference during reproduction by using a low frequency component of the reproduced signal is conducted.

8 Claims, 14 Drawing Sheets

(56) References Cited

U.S. PATENT DOCUMENTS

| | | | |
|---|---|---|---|
| 2008/0205246 A1 | 8/2008 | Shimano et al. | |
| 2008/0267039 A1* | 10/2008 | Horinouchi et al. | 369/103 |
| 2008/0310281 A1 | 12/2008 | Hara et al. | |
| 2009/0316539 A1 | 12/2009 | Mikami et al. | |
| 2010/0020669 A1* | 1/2010 | Ayres | 369/103 |
| 2010/0165825 A1 | 7/2010 | Saito et al. | |
| 2011/0080815 A1* | 4/2011 | Mikami et al. | 369/47.19 |

FOREIGN PATENT DOCUMENTS

| | | |
|---|---|---|
| JP | 05-342678 | 12/1993 |
| JP | 06-068470 | 3/1994 |
| JP | 06-223433 | 8/1994 |
| JP | 2007220206 | 8/2007 |
| JP | 2007317284 | 12/2007 |
| JP | 2008065961 | 3/2008 |
| JP | 2008-251133 | 10/2008 |
| JP | 2008269680 | 11/2008 |
| JP | 2008-310924 | 12/2008 |
| JP | 2010170616 | 8/2010 |
| JP | 2010218591 | 9/2010 |

OTHER PUBLICATIONS

Japanese Office Action dated Apr. 23, 2013 corresponding to Japanese Application No. 2009-283578.

* cited by examiner

With phase servo

Without phase servo

OPTICAL INFORMATION RECORDING/REPRODUCING APPARATUS AND OPTICAL INFORMATION REPRODUCING APPARATUS

CLAIM OF PRIORITY

The present application claims priority from Japanese patent application JP 2009-283578 filed on Dec. 15, 2009, the content of which is hereby incorporated by reference into this application. U.S. application Ser. No. 12/893,069 is a cross referenced application.

FIELD OF THE INVENTION

The present invention relates to an improvement in S/N ratio of a reproduced signal of an optical disc device.

BACKGROUND OF THE INVENTION

An optical disc has reached the substantial limits of resolution of an optical system with commercialization of Blu-ray discs using a blue semiconductor laser and a high NA objective lens. It is conceivable that multilayered recording layers will become important in the future, for the purpose of further increasing the capacity. In the multilayer optical disc, since there is a need to make the detected light quantities from the respective recording layers substantially equal to each other, the reflectivity of light from a specific recording layer must be reduced. However, since there is a need to increase the capacity of the optical disc and increase the dubbing speed of a video, a data transfer rate is continuously increased, and in this state, the S/N ratio of the reproduced signal cannot be sufficiently ensured in the future. Accordingly, in order to advance the multiplayer and higher speed of the future recording layers at the same time, the higher S/N ratio of detected signals is essential.

On the other hand, as another approach for increasing the number of recording layers, a method has been studied in which, like normal optical discs such as a CD or a DVD, lights are focused on a recording medium up to a substantially diffraction limit, and two opposed lights are focused at the same position to record interference fringes (standing waves) of those two lights in the vicinity of a focused point (for example, refer to R. R. Mcleod et al., "Microholographic multilayer optical disk data storage," Appl, Opt., Vol. 44, 2005, pp. 3197, and JP-A-2007-220206 (corresponding to EP1986187A)). In this system, while the surface recording density is comparable with that of the conventional optical disc, there is no need to provide a physical recording layer on the recording medium. This leads to such advantages that the multilayered recording layer is easily realized, multiple recording is enabled to facilitate the high capacity, and although a system that records interferences is applied, a strict tolerance such as a page data hologram is not required, and the implementation is relatively easy. Similarly, in this system, the quantity of reflected light from the recorded interference fringes is generally very weak as compared with the conventional optical disc, and resultantly the higher S/N ratio of the detected signal is essential.

The techniques related to the higher S/N ratio of the reproduced signal of the optical disc are disclosed in, for example, JP-A-Hei5 (1993)-342678, JP-A-Hei6(1994)-223433, and JP-A-Hei6(1994)-068470. JP-A-Hei5(1993)-342678 and JP-A-Hei6(1994)-223433 aim at the higher S/N ratio of the reproduced signal of a magnetooptic disc. In the technique, a light from a semiconductor laser is split before being irradiated onto an optical disc, and one split light that is not irradiated onto the optical disc is coupled, with another light reflected from the optical disc to interfere with each other. The amplitude of a weak signal is then amplified by increasing the quantity of light that is not irradiated onto the optical disc. In the differential detection of a transmitted light and the reflected light of a polarizing beam splitter conventionally used in the signal detection of the magnetooptical disc, an original incident polarization component is interfered with a polarization component orthogonal to an incident polarization direction, which is developed by polarization rotation due to the magnetooptical disc. Then, the orthogonal polarization component is amplified by the incident polarization and detected. Accordingly, although the signal can be increased by increasing the original incident polarization component, there is a need to suppress the light intensity incident to the optical disc to some degree or lower so as not to erase or overwrite the data.

On the contrary, in the above conventional technique, a signal light is separated from a light to be interfered in advance, and the light is interfered with the signal light without being focused on the disc. Then, the intensity of light to be interfered for signal amplification can be increased regardless of the light intensity of the disc surface. As a result, in principle, the S/N ratio compared with the noise of an amplifier that converts a photocurrent from a photodetector into a voltage can be enhanced more as the intensity is higher in an allowable range of the light intensity.

JP-A-Hei6(1994)-068470 aims at the higher S/N ratio of the reproduced signal of the optical disc using a photochromic medium in which, like JP-A-Hei5(1993)-342678 and JP-A-Hei6(1994)-223433, a light not irradiated onto the optical disc is interfered with a reflected light from the optical disc to amplify the signal. Likewise, in the optical disc using the photochromic medium, the deterioration of the medium is accelerated more as the incident light intensity is higher because of signal reproduction. Therefore, like the above magnetooptical disc, the intensity of light to be irradiated onto the recording medium is limited.

In JP-A-Hei5(1993)-342678, two lights are interfered with each other to detect the interference light intensity. In this case, an optical path length of the disc reflected light to be interfered is made variable to ensure the interference signal amplitude. In JP-A-Hei6(1994)-223433, JP-A-Hei6(1994)-068470, and JP-A-2007-317284, differential detection is also conducted in addition to the interference light intensity detection. As a result, the intensity components of the respective lights that do not contribute to the signal are canceled, and the signal amplitude is doubled to provide the higher S/N ratio.

In general, the interference signal obtained by interference of two lights depends on a phase difference (optical path length) between two lights to be interfered. On the contrary, in JP-A-Hei5(1993)-342678, a triangular prism that has been inserted into an optical path is made movable in the incident optical axis direction to stabilize an optical path length difference. Likewise, in JP-A-2007-317284, an entire interference optical system is made to follow the optical disc to cancel the optical path length difference caused by surface wobbling accompanied by rotation of the optical disc. Also, a position of a mirror that reflects the light that is not applied to the optical disc is made movable in the optical axis direction to stabilize the optical path length difference. In JP-A-2008-65961, plural interference signals different in interference state from each other are generated, and a signal is generated by arithmetic operation of those interference signals to output an amplified signal not depending on the phase difference.

SUMMARY OF THE INVENTION

In the above related art, in order to stably hold the interference signal, there is required that a movable object is made to follow the present surface bubbling about 300 μm of the optical disc, and the phase difference between the signal light and a reference light is fixed, that is, the optical path length difference is controlled with a precision of about several nm which is sufficiently smaller than the wavelength of a light source. In JP-A-2007-317284, an entire head or a mirror that reflects the reference light is made movable, by using a focus error signal for driving the objective lens for focusing the light on the disc, thereby controlling the optical path length difference between the signal light and the reference light. However, it is generally difficult to control the optical path length difference with a desired precision but with a low sensitivity to displacement of the optical path length difference in the normal focus error signal.

On the contrary, in JP-A-2008-65961, because a method for obtaining an output not depending on the optical path length difference is employed, there does not arise the above-mentioned problem. However, an increase in the number of interference lights to be detected makes the optical system configuration complicated. Further, in order to obtain the output not depending on the optical path length difference, high precision is required for various parameters of the optical system, and the construction of the optical system becomes very difficult. Also, because complicated arithmetic processing such as nonlinear operation is required in a signal process for obtaining the output not depending on the optical path length difference, a load on a signal processing circuit is increased. Also, because the signals not depending on the optical path length difference are output from the plural interference signals, thermal noises mixed into the respective interference signals are added to the signals to increase the noises, or noises are mixed into the signals due to incompleteness of the arithmetic processing. As a result, the arithmetic processing deteriorates the signal quality. Also, in the above-mentioned multilayer recording system, an improvement in the surface recording density of the recording data has not particularly been studied. For that reason, the data transfer rate is limited by the limited rotation speed of the disc.

In view of the above problem, a first object of the present invention is to provide an optical information recording/reproducing apparatus simple in configuration, which can conduct reproduction at a high S/N ratio and a high transfer rate.

A second object of the present invention is to provide an optical information reproducing apparatus simple in configuration, which can conduct reproduction at a high S/N ratio and a high transfer rate.

The first object of the present invention is achieved by the following means.

(1) In an optical information recording/reproducing apparatus in which two optical beams face each other and are focused at substantially the same place of an optical information recording medium to record a standing wave developed by interference of the two optical beams, during recording, an electric field complex amplitude of at least one of the two optical beams is modulated, and an optical path length difference of the two optical beams at the focused place is adjusted, and during reproduction, a reproduced light generated by irradiating any one of the two optical beams onto the optical information recording medium is allowed to interfere with a reproduction reference light generated from a light source to generate two interference lights different in interference phase by substantially 180 degrees from each other at the same time, the optical path length difference between the reproduced light and the reproduction reference light is adjusted, and an intensity difference between the two interference lights is detected.

With the above configuration, the reproduced signal from the optical information recording medium can be reproduced at a high S/N ratio, and the reproduced signal can be stably held with a simple configuration.

In this configuration, the two optical beams face each other, and are focused onto substantially the same place of the medium. It is unnecessary that the centers of the intensity distributions of the optical beams perfectly coincide with each other if the two optical beams interfere with each other.

(2) As another configuration, the modulation of the electric field complex amplitude is three-valued or more. With this configuration, the recording capacity as well as the data transfer rate can be improved.

(3) As another configuration, an average of the electric fields of the optical beams modulated by the electric field complex amplitude modulation is a value other than zero, and is different in phase from at least one of the respective electric fields after being modulated. With this configuration, a control signal for stabilizing the output can be easily obtained from the reproduced signal.

(4) As another configuration, the electric field complex amplitude modulation alternately repeats data recording modulation and servo control signal recording modulation, and the phase adjustment is conducted on the phase difference according to the reproduced signal of the servo control signal recorded by the servo control signal recording modulation. With this configuration, even when a phase fluctuation at the time of reproduction is quick, the reproduced signal can be stably obtained.

(5) As another configuration, the electric field complex amplitude modulation is single phase modulation. As a result, modulation at the time of recording can be conducted with a simple configuration.

(6) As another configuration, the first optical path length adjustment and the second optical path length adjustment are conducted by the same optical path length adjustment unit. As a result, the apparatus configuration can be simplified.

(7) As another configuration, a range of the phase modulation by the phase modulation unit is π radian. With this configuration, a dynamic range of the reproduced signal can be maximized, and the modulation can be most efficiently conducted.

(8) As another configuration, a range of the phase modulation is lower than π radian. With this configuration, data can be efficiently recorded or reproduced while keeping a high modulation rate of the phase adjustment element and a low drive voltage.

The second object of the present invention is achieved by the following means.

(9) In an optical information reproducing apparatus including: a light source; a split unit that splits an optical beam emitted from the light source into a first optical beam and a second optical beam; an interference optical system that couples a return light obtained by focusing and irradiating the first optical beam onto the optical information recording medium with the second optical beam to generate two interference optical beams different in the phase difference between the return light and the second light beam by about 180 degrees from each other; a detector that detects an intensity difference between the two interference optical beams; and an optical path length adjustment unit that adjusts an optical path length difference between the return light and the second optical beam, there are provided a phase adjustment unit that adjusts a phase difference between the return light and the second optical beam; and a phase control mechanism that adjusts the phase adjustment unit according to an output signal of the detector. With this configuration, the reproduced signal from the optical information recording medium can be reproduced at a high S/N ratio, and the reproduced signal can be stably held with a simple configuration.

(10) As another configuration, the phase adjustment unit adjusts the phase difference on the basis of an average electric field of optical electric fields of the return light, which has been modulated by the optical information recording medium, and the phase difference of the optical electric field of the second optical beam. With this configuration, a control signal for stabilizing the output can be easily obtained from the reproduced signal.

(11) As another configuration, the phase adjustment unit adjusts the phase difference according to phase servo control signals included in the output of the detector at given intervals. As a result, even when the phase fluctuation at the time of reproduction is quick, the reproduced signal can be stably obtained.

(12) A recording apparatus has a unit that modulates a phase difference between the two optical beams in multiple steps for recording. With this configuration, since an improvement in the recording density can be achieved, the transfer rate can be improved.

The optical information recording/reproducing apparatus high in the S/N ratio improvement effect, stable in the output, and simple in the configuration can be provided. Furthermore, the optical information recording/reproducing apparatus easy in producing a multivalued recorded signal, and high in the transfer rate with a high capacity can be provided.

DETAILED DESCRIPTION OF THE PREFERRED EMBODIMENTS

First Embodiment

Hereinafter, an embodiment of the present invention will be described with reference to FIG. 1.

Figure 1:
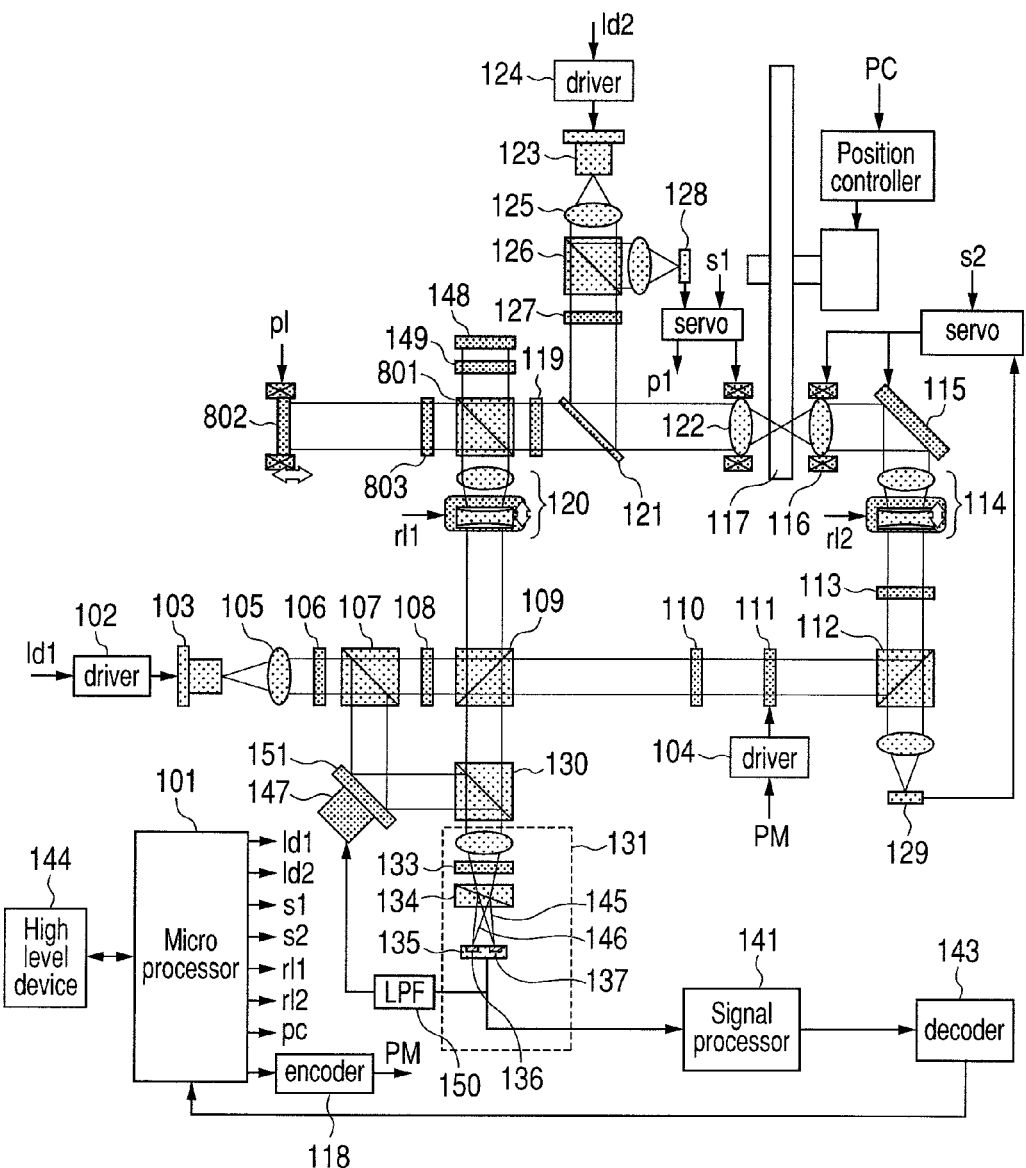
FIG. 1 is a diagram illustrating a configuration of a basic embodiment according to the present invention.

FIG. 1 illustrates a basic embodiment of the present invention. The operation at the time of recording will be first described. In response to an instruction from a microprocessor 101, a driver 102 drives a semiconductor laser 103 in a pulse manner in synchronization with signal modulation conducted by a driver 104 which will be described later, thereby allowing the semiconductor layer 103 to emit a pulsed optical beam. The optical beam is converted into a collimated light by a collimator lens 105. The collimated light enters a polarizing beam splitter 107 after having been transmitted through a λ/2 plate 106. The polarizing beam splitter 107 has a function of transmitting a p-polarized beam incident to a separation plane by substantially 100%, and reflecting an s-polarized beam by substantially 100%. A polarization state of the optical beam from the semiconductor laser is p-polarized, and at the time of recording, a direction of the optical axis of the λ/2 plate 106 is set to 0 degrees with respect to a horizontal plane, and the overall optical beam is transmitted through the polarizing beam splitter 107. Then, the optical beam enters a polarizing beam splitter 109 after having been transmitted through a λ/2 plate 108. In this example, at the time of recording, the direction of the optical axis of the λ/2 plate 108 is set to 22.5 degrees with respect to the horizontal plane, and the optical beam is polarized in a direction of 45 degrees, and enters the polarizing beam splitter 109. A p-polarization component of the optical beam is transmitted through the polarizing beam splitter 109, and an s-polarization component thereof is reflected by the polarizing beam splitter 109. The transmitted light (hereinafter called "signal light") and the reflected light (hereinafter called "reference light") are used for recording.

The signal light passes through a phase modulator 111 after having been polarized into the s-polarized beam by a λ/2 plate 110, and is then modulated in phase in synchronization with the pulsed light emission from the semiconductor laser 103. Then, the signal light is reflected by a polarizing beam splitter 112, and circularly polarized clockwise by a λ/4 plate 113. The signal light then passes through relay lens 114, is reflected by a galvanometer mirror 115, and focused in a recording medium 117 by an objective lens 116.

User data that has been sent from the microprocessor 101 is encoded into multivalued data by an encoder 118, and then sent to the driver 104 so as to serve as a modulation signal in the phase modulator 111. In this embodiment, modulation is eight-valued, and eight kinds of phases to be added to the signal by the phase modulator 111 are 0, 0.77, 1.13, 1.43, 1.71, 2.01, 2.37, and π (unit: radian). Further, modulation is conducted so that the respective phase values are used at an equal rate.

The reference light passes through a relay lens 120, is reflected by a polarizing beam splitter 801, and reflected by a mirror 802 mounted on a movable part in an opposite direction. The reference light again enters the polarizing beam splitter 801. In this situation, because the reference light reciprocates through a λ/4 plate 803, the polarization state is p-polarized, and the reference light is transmitted through the polarizing beam splitter 801. Thereafter, after the reference light has been circularly polarized clockwise by a λ/4 plate 119, the reference light is transmitted through a dichroic mirror, and focused in the recording medium 117 by an objective lens 122.

Figure 2:
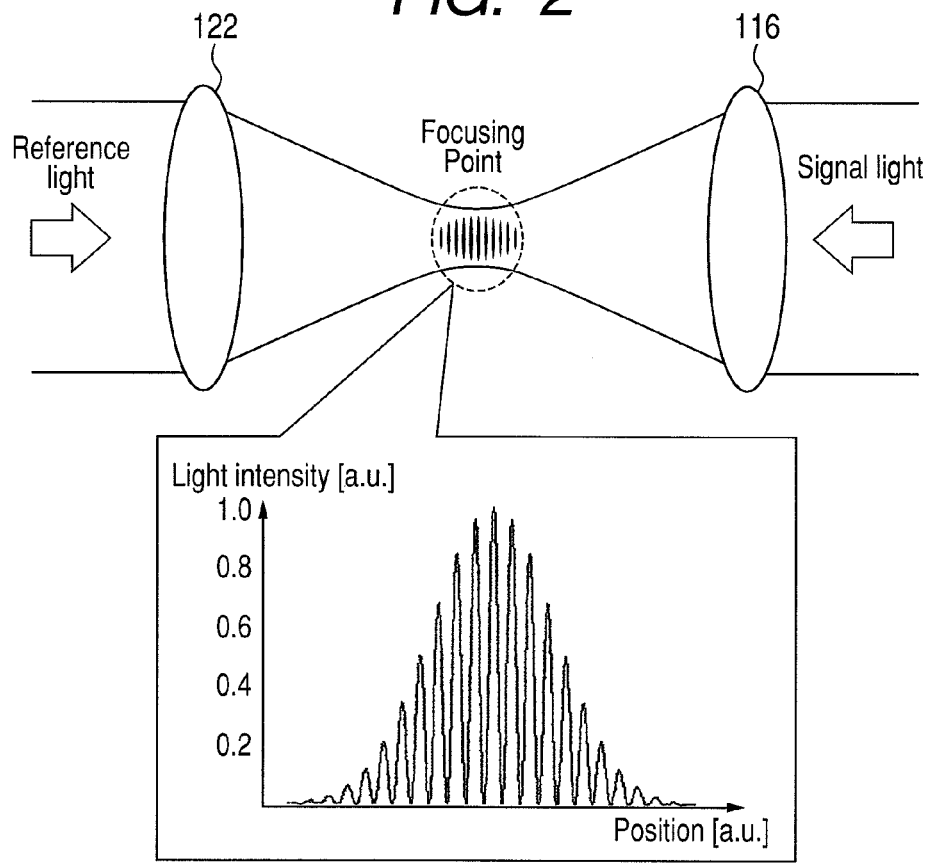
FIG. 2 is a diagram for describing a state in which a standing wave is generated by two facing optical beams.

The signal light and the reference light are focused at the same place in the recording medium 117. Then, as illustrated in FIG. 2, a standing wave (interference fringe) occurs in the light intensity distribution due to interference of the signal light and the reference light which are opposite in the light travel direction to each other. Because the signal light and the reference light are rapidly high in the power density in the vicinity of the focusing point, the standing wave locally exists substantially in the vicinity of the focusing point as shown in FIG. 2. The recording medium 117 undergoes the refractive index according to the intensity at each position of the standing wave, and a pattern of the interference fringe is recorded as a change in the refractive index of the medium.

Figure 3:
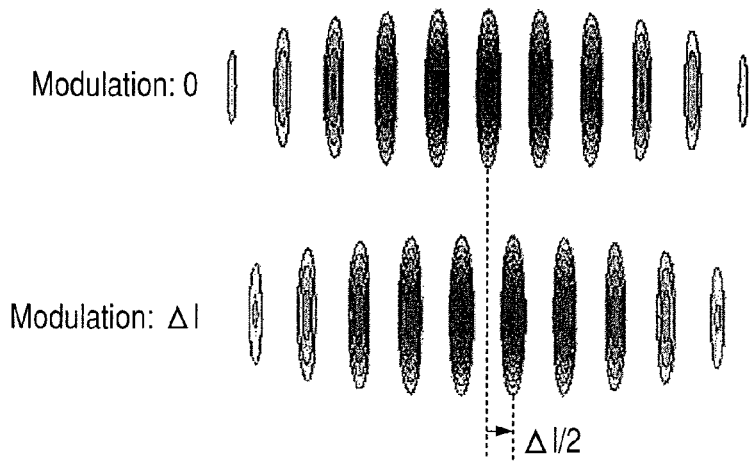
FIG. 3 is a diagram for describing the principle of phase recording due to the standing wave.

Now, a principle of recording the phase state according to the present invention will be described. In the above-mentioned interference fringe, for example, a position at which the intensity is 0 (that is, a position of each node of the standing wave) is determined according to an optical path length difference (that is, phase difference) of the signal light and the reference light. Accordingly, when the phase (optical path length) of the signal light is changed according to the phase modulator 111, the distribution of the interference fringe is shifted in the light travel direction according to the change in the phase as illustrated in FIG. 3 (more accurately, only the phase of the interference fringe is shifted without any change in an envelope caused by the power density of the signal light and the reference light). That is, the amount of phase modulation allocated to the signal light is recorded as a position of the refractive index distribution of the recording medium in the light travel direction.

For facilitation of more deeply understanding the above principle, the principle will be described by the aid of mathematical expressions. Because the signal light and the reference light are regarded as substantially plane waves in the vicinity of the focusing point, the respective electric fields are represented as follows.

$$E_s = \sqrt{I_s} \exp\left[\frac{2\pi}{\lambda}i(x-ct)\right] \quad \text{Ex. 1}$$

$$E_r = \sqrt{I_r} \exp\left[\frac{2\pi}{\lambda}i(-x-ct)\right] \quad \text{Ex. 2}$$

where I is the intensity of the signal light and the reference light (assuming that the intensities of the signal light and the reference light are equal to each other), λ is a wavelength of the light, n is a refractive index of the recording medium, x is a coordinate in the light travel direction, c is the light speed, and t is a time.

Since the time t is not included in the following expression, the intensity of the interference light caused by superimposing those electric fields represents that the intensity distribution of the interference light is the standing wave not depending on the time, and the cycle is a half wavelength λ/2.

$$|E_s + E_r|^2 = \left|\sqrt{I}\exp\left[\frac{2\pi}{\lambda}i(x-ct)\right] + \sqrt{I}\exp\left[\frac{2\pi}{\lambda}i(-x-ct)\right]\right|^2 \quad \text{Ex. 3}$$
$$= 2\left[I + I\cos\left[4\pi\frac{x}{\lambda}\right]\right]$$
$$= 4I\cos^2\left[\pi\frac{x}{\lambda}\right]$$

When the optical path length of the signal light is modulated by Δl, the intensity distribution of the interference light is represented by the following expression.

$$|E_s + E_r|^2 = \left|\sqrt{I}\exp\left[\frac{2\pi}{\lambda}i(x+\Delta l-ct)\right] + \sqrt{I}\exp\left[\frac{2\pi}{\lambda}i(-x-ct)\right]\right|^2 \quad \text{Ex. 4}$$
$$= 4I\cos^2\left[\pi\frac{x+\Delta l/2}{\lambda}\right]$$

The distribution of the interference fringe is shifted by Δl/2. Accordingly, the modulation of the optical path length (phase) of the signal light appears as the shift of the intensity distribution of the interference fringe, which is recorded as the refractive index distribution of the medium. The importance resides in that the optical path length (phase) to be modulated and the shift amount of fringe to be recorded have a strictly linear relationship, and the proportionality coefficient does not depend on the recording medium and the optical system. In the conventional multivalue recording system disclosed in JP-A-Hei5(1993)-342678 and the like, a response of the recording medium to the modulation level of the light intensity or the like is not linear, or the proportionality coefficient depends on the medium or the optical system. This makes it difficult to record the multivalued level with high precision. On the contrary, according to the system of the present invention, the modulation amount is reflected on the recording state with extremely high precision as described above, simple and high-precision recording is enabled with the result that the multivalued degree can be easily enhanced.

Figure 4:
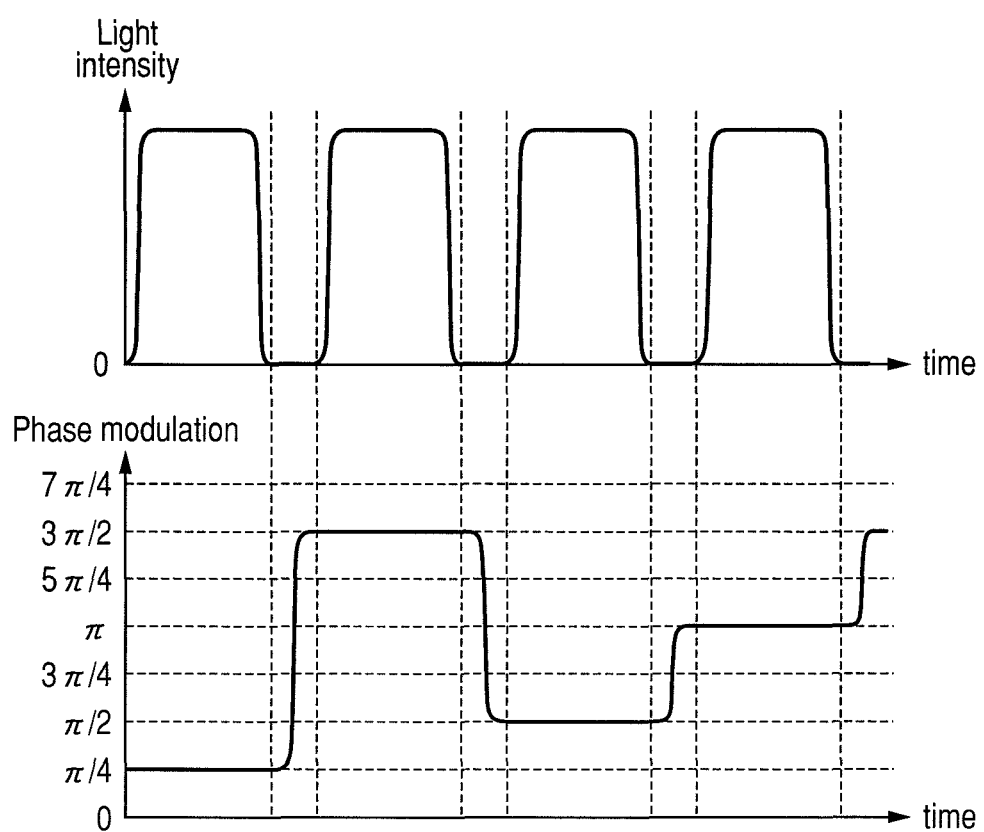
FIG. 4 is a diagram showing a relationship between a light emission pattern of a light source and phase modulation.

In this example, the emitted light pulse and the modulation of the phase modulator 111 will be described in detail. It is desirable that the modulation phase is a constant value while one phase modulation signal is recorded on the recording medium. If not, the interference fringes of the plural different phases are recorded at one place, causing the deterioration of the reproduced signal level and an error of the reproduced signal. For that reason, as illustrated in FIG. 4, the modulation phase of the phase modulator can be fixed when the light source is in a light emission state, and can be switched to a subsequent modulation phase when the light source is in a light non-emission state.

Figure 5:
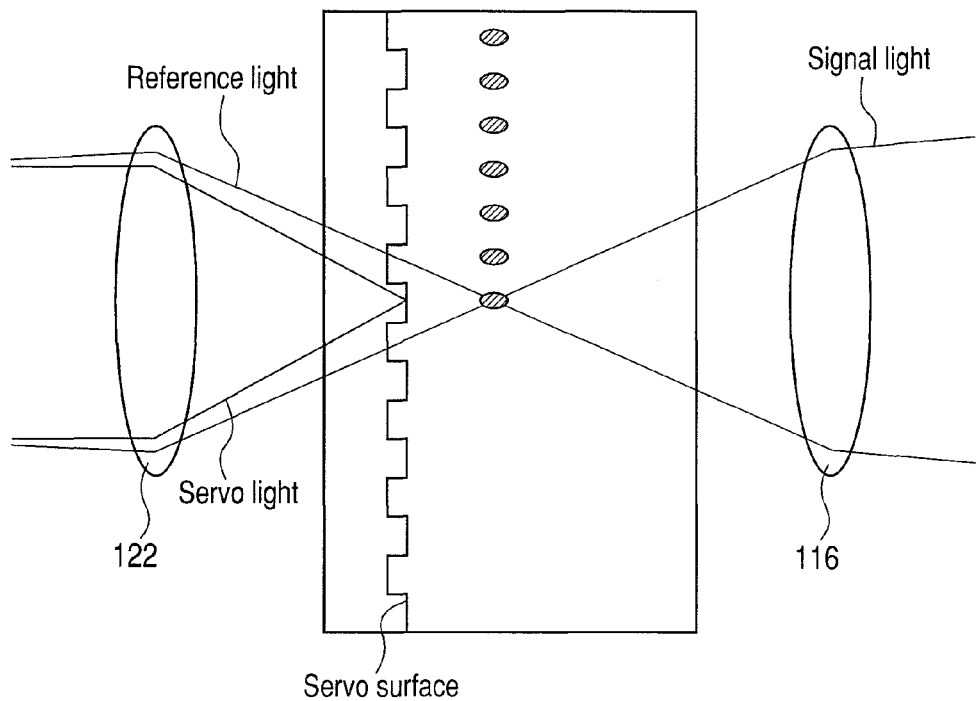
FIG. 5 is a diagram illustrating a state of a signal light, a reference light, and a servo light in a recording medium.

Now, returning to FIG. 1, a servo mechanism for stably conducting the recording operation will be described. A semiconductor laser 123 oscillates at a wavelength different from the semiconductor 103, and is driven by a driver 124 according to an instruction from the microprocessor 101 to output a p-polarized optical beam (hereinafter called "servo light"). In this embodiment, it is assumed that the wavelength of the light source 103 is 405 nm, and the wavelength of the light source 123 is 650 nm. After the light beam output from the light source 103 has been collimated into a collimated light through a collimator 125, the light beam passes through a polarizing beam splitter 126 and a λ/4 plate 127 so as to be converted into a right-circularly polarized light, and enters a dichroic mirror 121. The dichroic mirror 121 has a property of transmitting a light of 405 nm in wavelength and reflecting a light of 650 nm with the result that the reference light and the servo light are coaxial with each other. The servo light is focused on a servo surface formed in the recording medium 117 by the objective lens 122 (refer to FIG. 5). The servo surface is formed with grooves as with recording type CD and DVD, and a reflected light from the servo surface is detected by a 4-segmented detector 128. A servo signal is fed back to an objective lens actuator, thereby enabling focus servo and tracking servo to be performed. In this embodiment, the focus servo employs an astigmatic method, and the tracking servo employs a push-pull method. Because the reference light is coaxial with the servo light, a relative position of the focusing point on the recording medium is held. Accordingly, the relay lenses 114 and 120 are appropriately set so that the interference fringe can be recorded on a plane at a given distance from the servo surface. Also, one lens configuring the relay lenses is moved in the optical axis direction to change a position of the focusing point of the reference light in the optical axis direction. As a result, multilayer recording can be performed within a uniform recording medium. The relay lenses 114 and 120 are so designed as to cancel a spherical aberration occurring in the recording medium by each setting to conduct focusing with diffraction limit.

A focus error signal among the servo signals output from the 4-segmented detector 128 drives the mirror 802 as well as the movable part on which the mirror 802 is mounted. As a result, the optical path lengths of the signal light and the reference light are adjusted to be to the same degree in the focusing portion where the interference fringe is recorded even when the surface wobbling of the optical disc 117 occurs. More specifically, the mirror 802 is driven by the same amount as that of the objective lens 122. This adjustment is conducted for two reasons. One reason is that the signal light and the reference light have a sufficient coherence in the focusing portion. The optical path length difference of the signal light and the reference light in the focusing portion can be set within a coherence length of the light source with the movable mirror 802. Another reason is that the phase servo control that will be described later is appropriately conducted. The phase servo control functions to make the optical path length difference of the signal light and the reference light in the focusing portion fall within a stroke of a piezoelectric element 147 used for the phase servo control.

For that reason, the adjustment precision of the optical path length difference by the drive of the mirror 802 should be set to a value sufficiently smaller than both of the coherence length of the light source (semiconductor laser 103) and the stroke of the optical path length adjustment element (piezoelectric element 147) used for the phase servo control. In this embodiment, the coherence length of the semiconductor laser 103 is about 100 μm, and the stroke of the piezoelectric element 147 is about 10 μm, the adjustment precision is designed to be about 5 μm. In adjustment of the mirror position, the optical path length is also changed according to a position of the recording layer in the thickness direction. Therefore, the mirror position is offset according to the position of the recording layer (the same operation is conducted also at the time of reproduction).

In this embodiment, the light source 123 for generation of the servo light is used independently from the semiconductor laser 103 for generation of the reference light. However, the light source 12 is not an essential configuration in the present invention, but for example, the signal light, the reference light, and the servo light may be generated from the same light source.

On the other hand, the signal light is required to be focused at the same focusing point as that of the reference light in the recording medium 117. For that reason, servo drive is conducted with the use of the reference light that has been transmitted through the recording medium 117. More specifically, the reference light that has passed through the recording medium 117 is detected by the 4-segmented detector 129, and the position of the objective lens 116 in the optical axis direction is controlled through the astigmatic method. Also, the position of the objective lens 116 in the radial direction is controlled through the push-pull method of the radial direction, and an angle of the galvanometer mirror 115 in the tangential direction is controlled through the push-pull method of the tangential direction. As a result, the optical beams of the reference light and the signal light can be made perfectly coincident with each other (opposite only in the travel direction), and the focusing point of the signal light and the focusing point of the reference light are made coincident with each other to effectively generate the standing wave.

Subsequently, the operation at the time of reproduction will be described. The semiconductor laser 103 emits a DC light, and the DC light passes through the λ/2 plate 106, and enters the polarizing beam splitter 107. In this example, at the time of reproduction, the λ/2 plate 106 has the optical axis direction set to 22.5 degrees with respect to the horizontal direction. The p-component of the optical beam which has been polarized by 45 degrees is reflected from the polarizing beam splitter 107 whereas the s-component thereof is transmitted through the polarizing beam splitter 107. The transmitted light passes through the λ/2 plate 108, and enters the polarizing beam splitter 109. At the time of reproduction, the λ/2 plate 108 has the optical axis direction set to 45 degrees with respect to the horizontal direction, and the optical beam is s-polarized, and totally reflected by the polarizing beam splitter 109. That is, the optical beam called "signal light" at the time of recording is not generated, and only the reference light is generated. The reference light follows the same optical path as that at the time of recording, and is focused in the recording medium 117 by the objective lens 122 that is subjected to servo control by the optical beam of the semiconductor laser 123 as in the time of recording. Similarly, the relay lens 120 is appropriately set to focus the reference light on a given recording layer.

Figure 6:
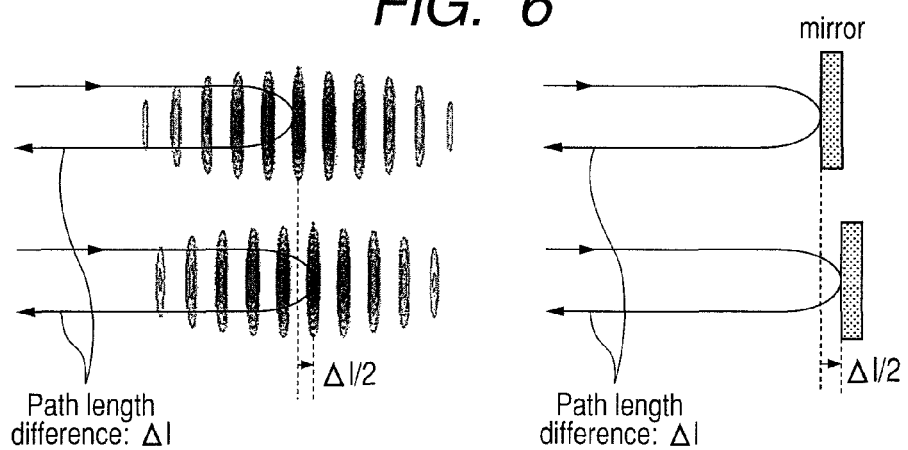
FIG. 6 is a diagram for describing a state in which a phase of a reproduced signal is modulated by a position of a recorded standing wave.

When the reference light is irradiated onto the place where the standing wave has been recorded as the refractive index change of the recording medium 117 at the time of recording, the reflected light is generated by the cyclic refractive index change. The reflected light is generated at a different phase according to the position of the recorded interference fringe in the optical axis direction. This is understood as follows. For example, as illustrated in FIG. 6, when the distribution of the refractive index change which is a reflector is distanced, an optical path length that is twice the distanced interval is added as with reflection by a general mirror. As has been already described above, a distance of half the optical path length (phase) added to the signal light by the phase modulator at the time of recording is the shift of the standing wave distribution. Therefore, at the time of reproduction, twice the shift amount, that is, the phase of the amount equal to the phase added to the signal light by the phase modulator 111 is allocated to the reflected light. Accordingly, the reflected light is output at the same phase as that of the signal light at the time of recording. In the following description, the reflected light is called "reproduced light".

The reproduced light travels along the optical path of the reference light in an opposite direction, and passes through the dichroic mirror 121. Thereafter, the reproduced light is polarized into the s-polarized light by the λ/4 plate 119, and reflected by the polarizing beam splitter 801, and the optical path is returned by the mirror 148. Then, the reproduced light reciprocates through the λ/4 plate 149 so as to be polarized into the p-polarized light, and is transmitted through the polarizing beam splitters 801, 109, and 130. On the other hand, the s-polarized optical beam (called "reproduced reference light") that has reflected the polarizing beam splitter 107 is reflected by the polarizing beam splitter 130, and becomes coaxial with the reproduced light.

The reproduced light and the reproduction reference light enter the detection optical system 131 in a state where their polarizations are orthogonal to each other. The incident optical beam passes through the λ/2 plate 133 having the optical axis set to 22.5 degrees with respect to the horizontal direction so that the polarization of the optical beam rotates by 45 degrees, and is split into the p-polarization component and the s-polarization component by a Wollaston prism 134. Split optical beams 145 and 146 enter two photodiodes 136 and 137 of a differential detector 135, respectively, and an electric signal proportional to a difference in the intensity is output from the differential detector 135. As will be described later, the optical beam that has been split by the Wollaston prism 139 is an interference light where the reproduced light and the reproduction reference light interfere with each other, and an output of the differential detector 135 is the extracted interference component.

Figure 7:
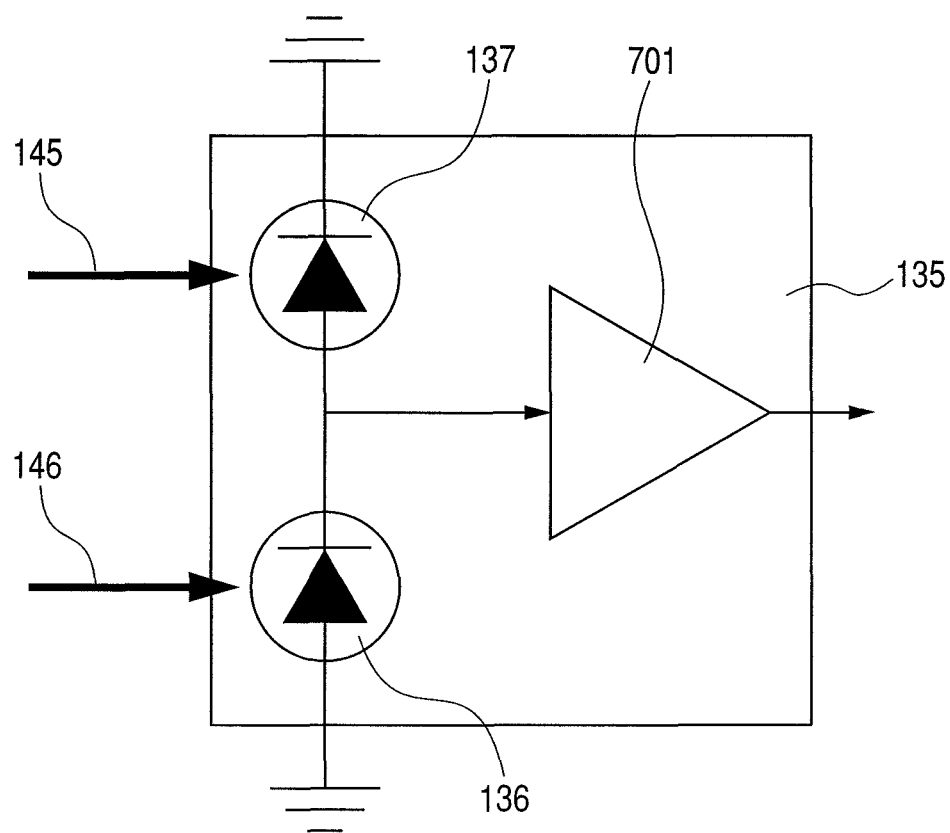
FIG. 7 is a diagram illustrating the configuration of a differential detector of the current differential type.

The details of the differential detector 135 are illustrated in FIG. 7. A difference of the photocurrents occurring in the two photodiodes 136 and 137 that have received the respective interference lights is input to a transimpedance amplifier 701, and converted into a voltage to be output. Accordingly, an output voltage proportional to the intensity difference of the optical beams 145 and 146 is output from the differential detector 135.

The output of the differential detector 135 is sent to a digital signal processor 141 to obtain a reproduced signal corresponding to the phase value recorded therein. The reproduced signal is sent to a decoder 143 so as to be converted into user data, and sent to a high level device 144 through the microprocessor 101.

The output of the differential detector 135 is also used as a drive voltage of the piezoelectric element 147 on which a mirror 151 that reflects the reproduction reference light is mounted after the output has passed through a low-pass filter 150 to remove a high-frequency reproduction signal component from the output. As will be described later, as a result, an average phase relationship (except for the reproduction signal component) when the reproduced light and the reproduction reference light interfere with each other is held constant to obtain a stable signal output (hereinafter the servo control is called "phase servo control"). A principle in which the interference light is generated by the detection optical system 131 to thereby reproduce recorded information will be described. Because the optical beam that enters the detection optical system 131 includes the reproduced light as the p-polarization component and the reproduction reference light as the s-polarization component, the polarization state is represented by Jones vector as follows.

$$\begin{pmatrix} E_r \\ E_s \end{pmatrix} \quad \text{Ex. 5}$$

where $E_s$ is an electric field of the reproduced light, and $E_r$ is an electric field of the reproduction reference light. Also, a first component of the vector represents the p-polarized light, and a second component thereof represents the s-polarized light. The Jones vector after the optical beam has passed through the λ/2 plate 133 is represented as follows.

$$\begin{pmatrix} \cos 45° & -\sin 45° \\ \sin 45° & \cos 45° \end{pmatrix} \begin{pmatrix} E_r/\sqrt{2} \\ E_s/\sqrt{2} \end{pmatrix} = \begin{pmatrix} (E_r - E_s)/2 \\ (E_r + E_s)/2 \end{pmatrix} \quad \text{Ex. 6}$$

Because the optical beam is split into the p-polarization component and the s-polarization component by the Wollaston prism 134, the respective electric fields of the split optical beams are represented as follows.

$$\frac{1}{2}(E_r - E_s) \quad \text{Ex. 7}$$

$$\frac{1}{2}(E_r + E_s) \quad \text{Ex. 8}$$

Thus, the optical beam becomes the superimposition of the reproduced light and the reproduction reference light, that is, the interference light. The respective intensities of those split optical beams 145 and 146 are represented as follows.

$$\left|\frac{1}{2}(E_r - E_s)\right|^2 = \frac{1}{4}|E_r|^2 + \frac{1}{4}|E_s|^2 - \frac{1}{2}|E_r E_s|\cos\Delta\phi \quad \text{Ex. 9}$$

$$\left|\frac{1}{2}(E_r + E_s)\right|^2 = \frac{1}{4}|E_r|^2 + \frac{1}{4}|E_s|^2 + \frac{1}{2}|E_r E_s|\cos\Delta\phi \quad \text{Ex. 10}$$

The first term and the second term represent the intensity components of the reproduced light and the reproduction reference light, respectively, and the third term represents the interference of the reproduced light and the reproduction reference light. $\Delta\phi$ is a phase of the reproduced light based on the phase of the reproduction reference light, which coincides with the modulation phase. Because the output of the differential detector 135 is proportional to a difference in the intensity of those split lights, the output is represented as follows.

$$D_1 = \eta |E_r E_s| \cos\Delta\phi \quad \text{Ex. 11}$$

The output is proportional to the term representative of the interference. Symbol is the conversion efficiency of the detector. In this example, as described above, $\Delta\phi$ is modulated into eight values, and eight kinds of values including $-|E_s E_r|$ to $|E_s E_r|$ are output according to the modulation phase (in this embodiment, particularly, phase modulation is conducted so that differences between the respective output levels become regular intervals; that is, eight kinds of output levels are −|EsEr|, −5|EsEr|/7, −3|EsEr|/7, −|EsEr|/7, |EsEr|/7, 3|EsEr|/7, 5|EsEr|/7, and |EsEr|. That is, the output level of the differential detector 135 is the reproduced signal corresponding to the recorded phase.

Subsequently, a principle of stabilizing the output signal under the phase servo control will be described. Symbol Δϕ in Expression 16 actually includes a component other than the modulation phase, and is precisely represented as follows.

$$\Delta\phi = \phi_s + \phi_{r-1} + \phi_{r-2}$$ Ex. 12 where ϕs is a phase modulated by the phase modulator 111, ϕr1 is a phase difference corresponding to the optical path length difference (except for the phase modulation amount) between the signal light and the reference light at the time of recording, and ϕr2 is a phase difference corresponding to the optical path length difference (except for the phase modulation amount) between the reproduced light and the reproduction reference light at the time of reproduction. The phase differences ϕr1 and ϕr2 are generated by residual errors (within about 5 µm, respectively, in this embodiment) of the optical path length control by the mirror 802 at the time of recording and reproduction. Those phase differences vary with time, and the fluctuation speed is about several tens kHz to several hundreds kHz. On the contrary, the reproduction speed of data which has been focused up to the vicinity of the diffraction limit and recorded as in this embodiment is sufficiently higher than the surface wobbling (several tens MHz to several hundreds MHz). In this example, a frequency that is allowed to pass through the low-pass filter 150 is set to the same degree as the surface wobbling, the phase change due to the signal modulation is averaged, and the signal that has undergone only the phase change due to the surface wobbling is driven by the piezoelectric element 147. This signal can be regarded as a signal at the time of detecting the averaged reproduction optical electric field (ϕn is each value of eight kinds of modulation phases).

$$E_m = \sum_{n=0}^{7} |E_s|\exp[i(\phi_n + \phi_{r1} + \phi_{r2})]$$

$$= |E_s|\exp[i(\phi_{r1} + \phi_{r2})]\sum_{i=0}^{7} \exp[i\phi_n]$$

$$= |E_s|\exp[i(\phi_{r1} + \phi_{r2})] \times 0.864i$$

$$0.864\eta|E_sE_r|\cos\left[\phi_{r1} + \phi_{r2} + \frac{\pi}{2}\right] = 0.864\eta|E_sE_r|\sin[\phi_{r1} + \phi_{r2}]$$ Ex. 14

Accordingly, the signal is set as an error signal of the phase, and the piezoelectric element is driven so that the signal becomes zero, to control ϕr2. Therefore, ϕr1+ϕr2=0, that is, an unnecessary phase component can be kept to zero. As a result, as the reproduction signal, the output includes only the phase component of the signal modulation, and the reproduced signal can be appropriately obtained. The phase error signal is for directly detecting the variation in the phase which is a cause of the fluctuation of the output signal as understood from Expression 14. The phase error signal is used to conduct the optical path length control with the results that a precision of about several nm or lower can be obtained, and the reproduced signal can be stably output.

Figure 8A:
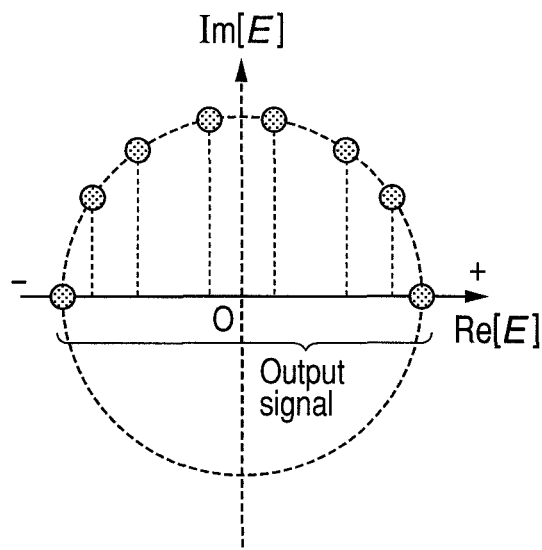
FIGS. 8A and 8B are diagrams each illustrating an electric field complex amplitude of the reproduced light.
Figure 8B:
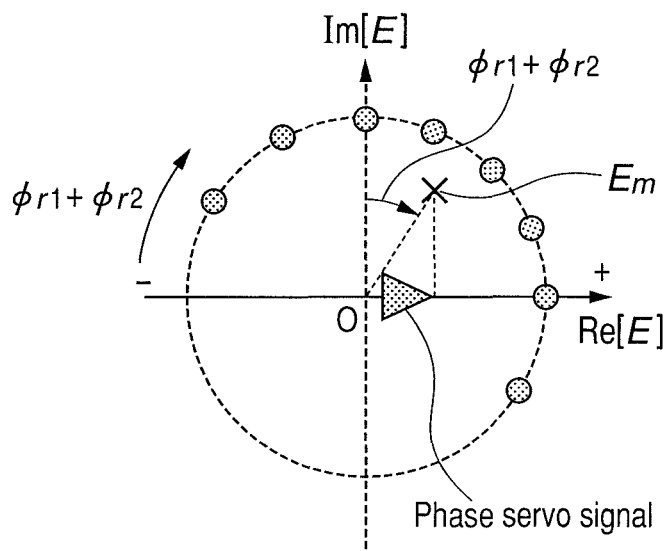

In order to more clarify the principle of the phase servo control, the reproduction optical electric field is illustrated in a complex plane and described. As illustrated in FIG. 8A, eight electric fields of the reproduced light are arranged between the respective concentric phases 0 to π in an ideal case where no unnecessary phase component (ϕr1+ϕr2) is included in the reproduced light. As is apparent from Expression 14, the output signal of the differential detector 135 is the real part components of those electric fields, and a voltage level corresponding to the modulation phase is output. On the contrary, when the unnecessary phase component ϕr1+ϕr2 is included, as illustrated in FIG. 8B, the respective electric fields rotate by ϕr1+ϕr2, and an error occurs in the output signal of the differential detector with the result that an appropriate reproduced signal is not obtained. In this example, an average electric field of the reproduced light at this time faces a direction rotated by ϕr1+ϕr2 from a direction of 90 degrees in phase as illustrated in the figure. The real part component (corresponding to the output of the low-pass filter 150) is a positive value when ϕr1+ϕr2 is a positive value, and a negative value when ϕr1+ϕr2 is a negative value. Accordingly, control is conducted so that when a positive voltage is applied to the piezoelectric element, ϕr2 is reduced, and when a negative voltage is applied thereto, ϕr2 is increased. As a result, the real part component of the average electric field can be kept to 0, and an ideal state of FIG. 8A can be maintained.

In this embodiment, the phase modulation at the time of recording is conducted in a range of 0 to π which is for the purpose of maximizing the S/N ratio of the output signal. An output of the differential detector 135 ranges from −|EsEr| to |EsEr|. A range of the phase modulation is set to 0 to π so that the output range can be used as the reproduced signal level. Conversely, even when the phase modulation range is larger than those values, the range of the output signal level is the same, and the S/N ratio is not improved. As the modulation phase amount due to the phase modulator is smaller, there are more advantageous in the drive voltage and the modulation speed. Therefore, modulation in the range of 0 to π is most efficient.

Figure 9A:
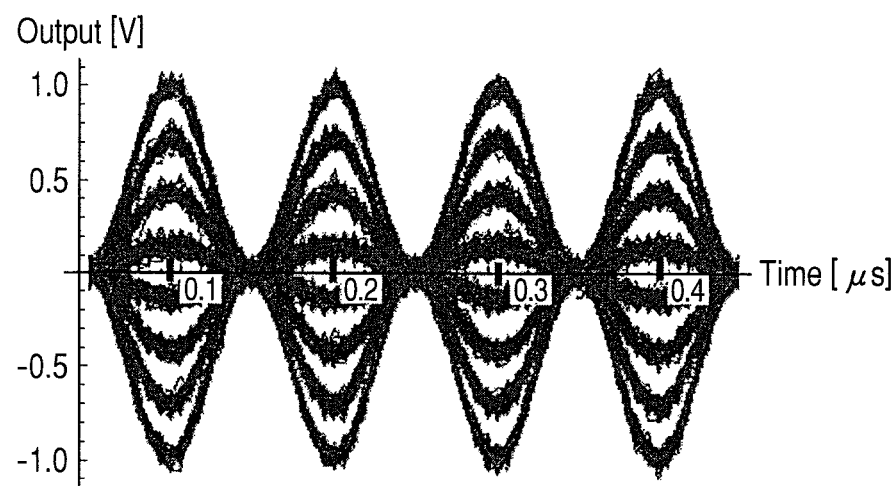
FIGS. 9A and 9B are diagrams each illustrating the simulation results of the reproduced signal.
Figure 9B:
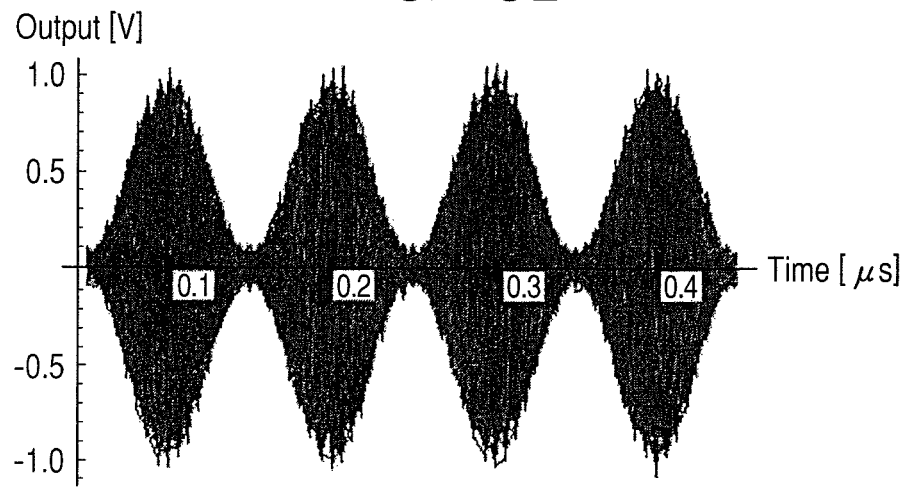

FIG. 9A illustrates the simulation results of the reproduced signal eye pattern according to this embodiment. The S/N ratio to the output signal level (1 V in this results) when the modulation phase is 0 is set to 30 dB. In this result, modulation of eight values is conducted in a range of −1 to 1 (at regular intervals) according to the modulation phase. The respective levels can be sufficiently identified. On the contrary, a reproduced signal eye pattern in a state where the phase servo is not driven is illustrated in FIG. 9B. In this case, because the phase between the reproduced light and the reproduction reference light changes at random, the output level also continuously changes, thereby making it difficult to identify a difference in the output level corresponding to the phase modulation.

Figure 10:
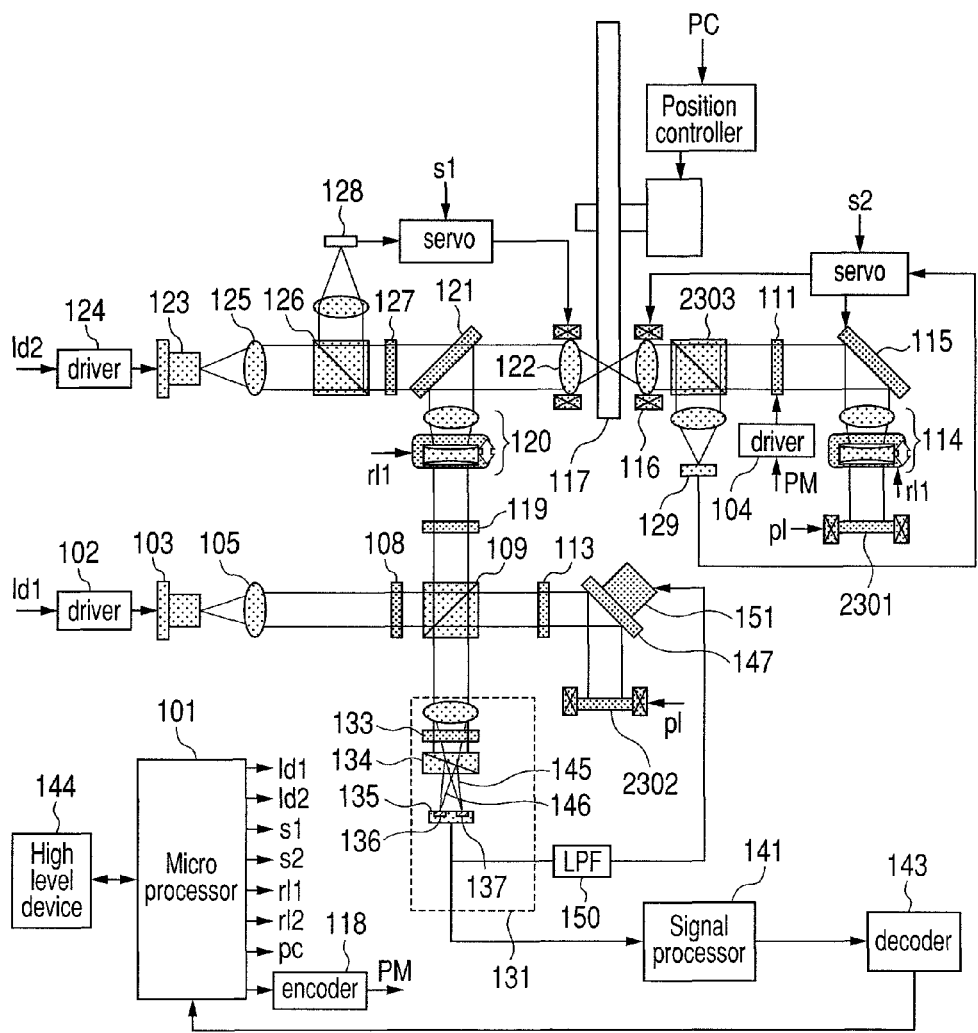
FIG. 10 is a diagram illustrating a configuration of another embodiment using a transmitted light of a reference signal from the recording medium as a signal light.

In this embodiment, at the time of recording, the optical beam from the semiconductor laser 103 is split to generate the signal light and the reference light, and input those lights from an opposite side of the recording medium. However, the method of generating the signal light and the reference light, and the method of inputting those lights are not limited to this configuration. For example, as illustrated in FIG. 10, the optical beam that first enters the recording medium may be set as the reference light, and the reference light that has been transmitted through the recording medium may be set as the signal light. In this case, the signal light is reflected by a mirror 2301, follows the same optical path backward, again enters the recording medium, and interferes with the reference light. The phase modulator 111 can be inserted between the recording medium and the mirror 2301. For the optical path length adjustment in this configuration, the mirror 2301 that reflects the signal light is driven at the time of recording, and a mirror 2302 that reflects the reproduction reference light is driven at the time of reproduction, by the aid of the focus servo signals, respectively. Also, as disclosed in US2010-165825A1, configuration can be made as follows. That is, the signal light and the reference light are made coaxial with each other, and enter the recording medium from the same direction. One of the signal light and the reference light is reflected by a mirror surface formed on a rear surface of the recording medium, and those lights are focused at the same focusing point from the opposite directions.

Figure 11:
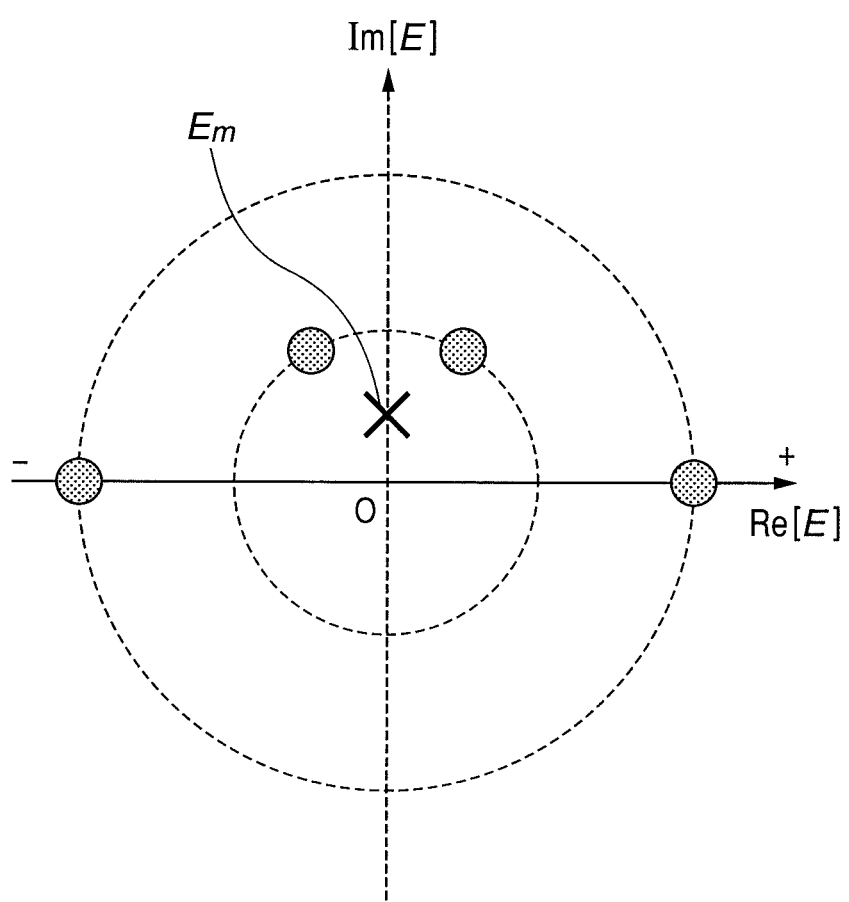
FIG. 11 is a diagram illustrating an electric field complex amplitude distribution when the electric field complex amplitude of the signal light is modulated.

In this embodiment, only the phase modulation is dealt with as the signal modulation. However, in the present invention, the same effect can be obtained more generally by modulating the electric field complex amplitude of the signal light, and conducting modulation so that the average electric field of the reproduced light is not 0. The modulation of the electric field complex amplitude can be obtained by modulating the phase and intensity of the signal light at the same time. In this embodiment, the intensity modulator may be arranged before and after the phase modulator 111 in the signal optical path, or the light emission power of the semiconductor laser 103 may be controlled at the same time when the phase modulator is driven. FIG. 11 exemplifies a signal optical electric field in which the modulation is conducted at four values 0, $\pi/3$, $2\pi/3$, and $\pi$ of the phase, and the intensity modulation is conducted when the phases are $\pi/3$ and $2\pi/3$, and comparison is conducted, and the intensity is reduced to half when the phases are 0 and $\pi$. Similarly, in this case, because the average electric field has the same phase as that in the above embodiment, the phase servo control can be conducted.

Figure 19:
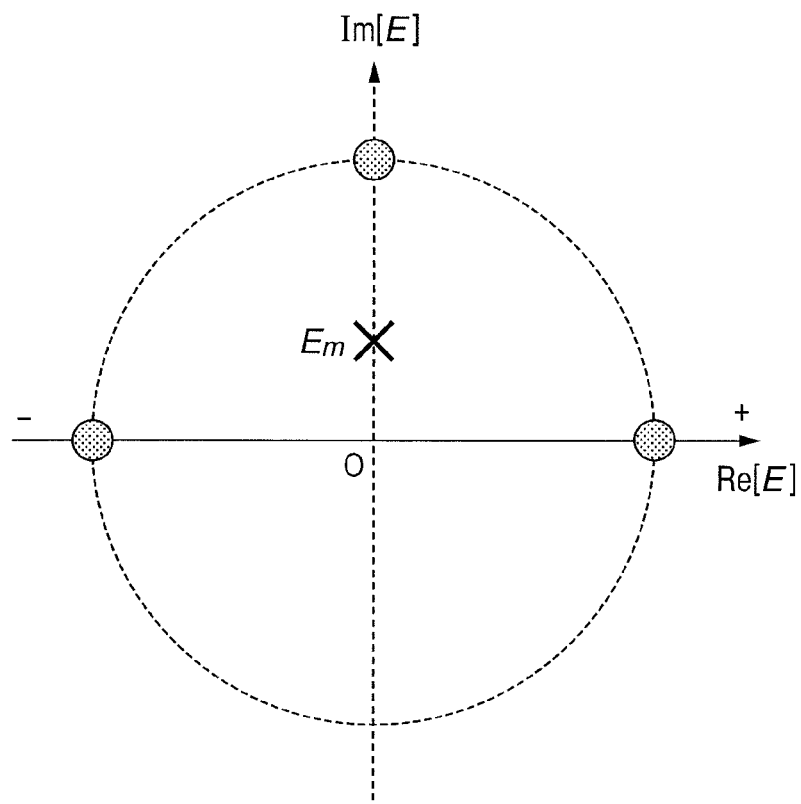
FIG. 19 is a diagram illustrating an electric field complex amplitude distribution in the case of phase modulation of three values.

In this embodiment, the modulation of eight values is conducted as the phase modulation. In principle, the modulation of an arbitrary multivalue which is 2 or more may be conducted. In particular, when the modulation of 3 values or more is conducted as in this embodiment, recording can be conducted with high density and, and the data transfer rate can be increased as compared with the general optical disc of binary modulation. In the case of the three-valued modulation, for example, as illustrated in FIG. 19, the modulation can be realized by setting the modulation phases to 0, $\pi/2$, and $\pi$.

Second Embodiment

Figure 12A:
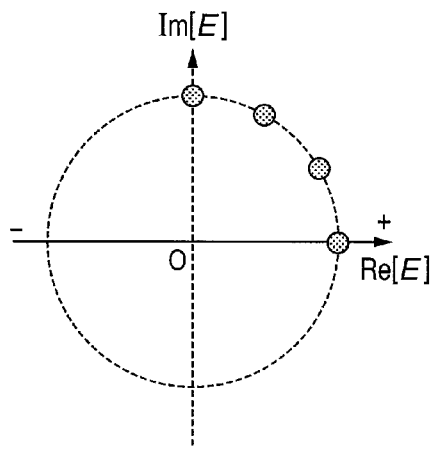
FIGS. 12A and 12B are diagrams each illustrating the electric field complex amplitude distribution of the reproduced light when the phase modulation is lower than π.
Figure 12B:
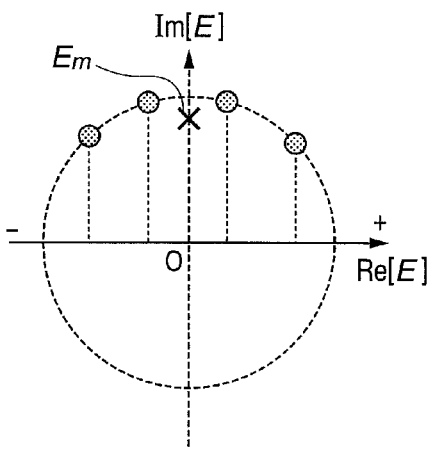

In this embodiment, a range of the phase modulation amount is smaller than $\pi$ with respect to the first embodiment. The modulation phases in this embodiment are four kinds of 0, $\pi/6$, $\pi/3$, and $\pi/2$, and the electric field of the modulated light is represented as illustrated in FIG. 12A. In this example, the reproduction optical electric field when the phase servo control is conducted at the time of reproduction is illustrated in FIG. 12B, and four kinds of levels corresponding to the modulation phase are output from the differential detector 135 in a range of $-|EsEr|/\sqrt{2}$ to $|EsEr|/\sqrt{2}$. In this way, when the phase adjustable range of the phase modulator is lower than $\pi$, when the drive voltage of the phase modulator needs to be suppressed to a lower value, or when the phase adjustment speed needs to be increased, the phase servo drive is enabled even when the phase adjustment range is limited to be lower than $\pi$, and the reproduced signal can be appropriately obtained.

Third Embodiment

Figure 13:
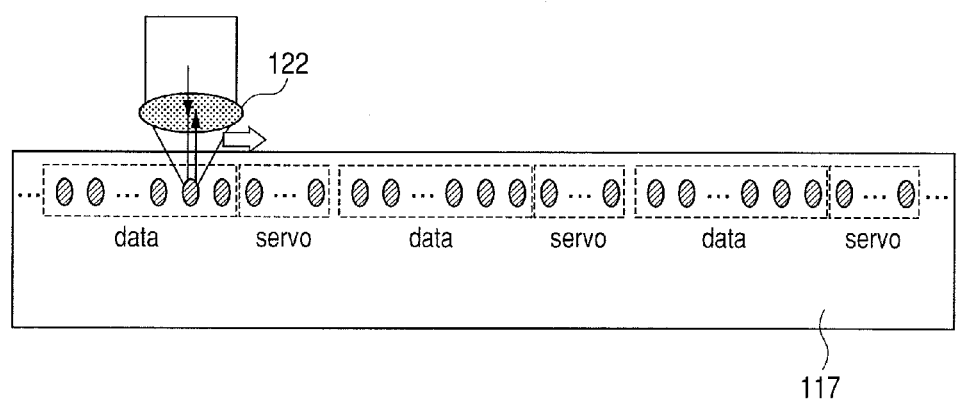
FIG. 13 is a diagram for describing a recording method when phase servo control is conducted by a sample servo system.
Figure 14:
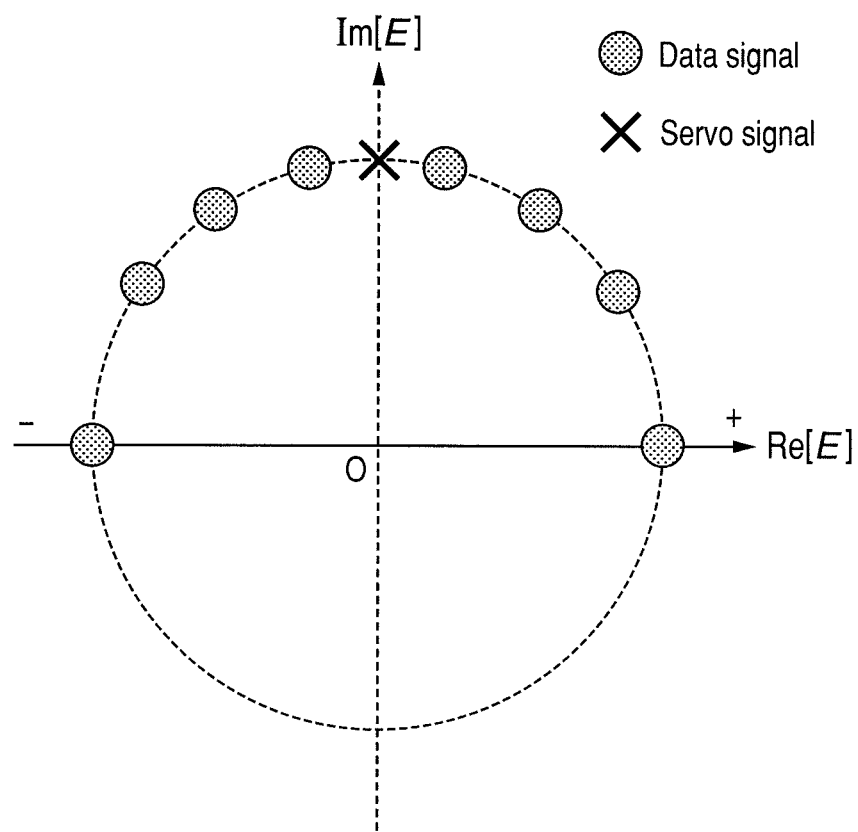
FIG. 14 is a diagram illustrating the electric field complex amplitude distribution of the reproduced light when the phase servo control is conducted by the sample servo system.

In this embodiment, a sample servo system is used as the phase servo control. In this case, information recording only for the servo signal acquisition is conducted in a given cycle at the time of recording. In this case, data regions (regions of "data" in the figure) and sample servo signal regions (regions of "servo" in the figure) are repeated in the recording medium in a given cycle as illustrated in FIG. 13. The recording medium thus recorded is reproduced in the same manner as that in the first embodiment, and the reproduced signal output of the data regions is processed as the reproduced signal in the same manner as that of the first embodiment. The reproduced signal output of the sample servo signal regions is driven by the piezoelectric element as a phase servo control signal. In this embodiment, the phase modulation of the signal is eight-valued by 0, 0.77, 1.13, 1.43, 1.71, 2.01, 2.37, and $\pi$ (unit: radian) as with the first embodiment, and the modulation of $\pi/2$ is conducted as the phase modulation for the sample servo signal (refer to FIG. 14). In this example, the reproduced light electric field for the sample servo control has the same phase as that of the average electric field of the reproduced light in the first embodiment, and the phase servo control can be conducted as in the first embodiment.

The sample servo system needs to acquire the average value of the electric field unlike the first embodiment. When the fluctuation speed of the optical path length is relatively close to the speed of the signal modulation, there is the possibility that the statistical fluctuation of the average value occurs, the phase error signal fluctuates, and the reproduced signal becomes unstable in the method of the first embodiment. On the other hand, in the sample servo system, even in such a case, the phase error signal is stably output, and the reproduced signal can be stably kept.

Fourth Embodiment

Figure 15:
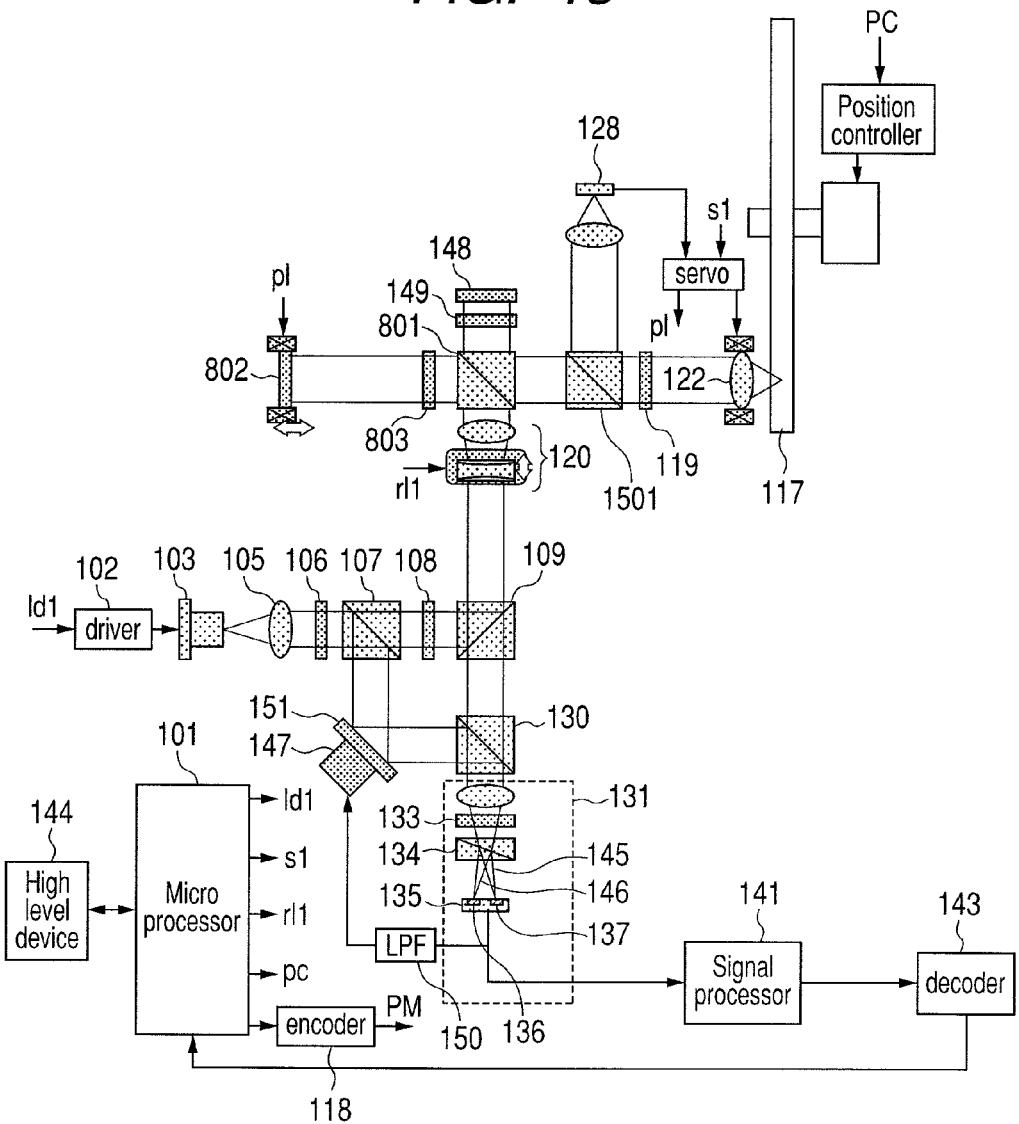
FIG. 15 is a diagram illustrating the configuration of an optical information reproducing apparatus according to the present invention.
Figure 16A:
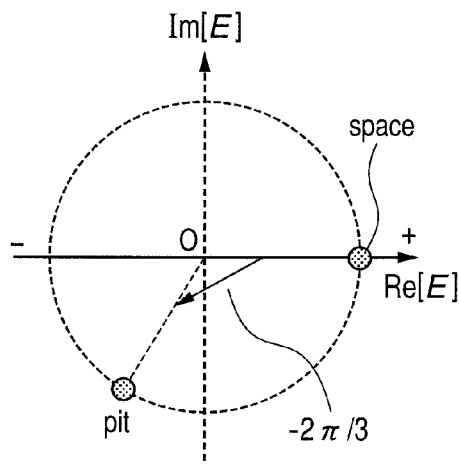
FIGS. 16A and 16B are diagrams each illustrating the electric field complex amplitude distribution of the reproduced light when a ROM disc is reproduced.
Figure 16B:
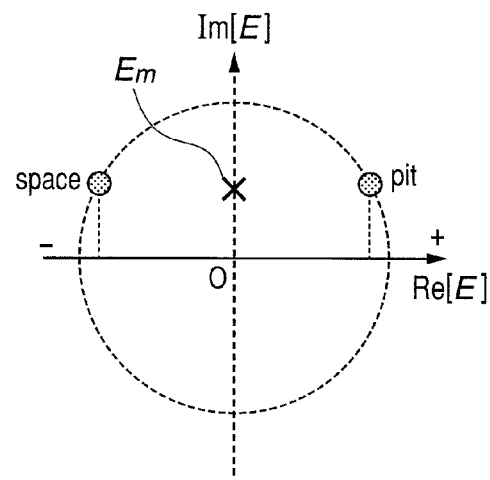

This embodiment shows an optical information reproducing apparatus according to the present invention. The configuration of this apparatus is illustrated in FIG. 15, and the optical path of the signal light (used only at the time of recording) is omitted from the configuration (FIG. 1) of the first embodiment. Also, as the method of acquiring the servo signal, the servo light source is additionally used in the first embodiment. On the other hand, in this embodiment, a part of the reproduced light is extracted by a special polarizing beam splitter 1501, a focus error signal and a tracking error signal are generated by the 4-segmented detector 128 as in the first embodiment to drive the objective lens 122 and the mirror 802. The special polarizing beam splitter transmits the p-polarized light by 100%, and transmits the s-polarized light by 90%, and reflects the s-polarized light by 10%. The special polarizing beam splitter transmits he optical beam from the light source by 100%, and partially reflects the return light from the recording medium. In this example, for generation of the focus error signal and the tracking error signal, the servo surface on the recording medium is not used, but what is generated by the recorded data is used. In this embodiment, the same operation as that at the time of reproduction in the first embodiment is conducted. However, the recording medium is not limited to the recorded one, but may be, for example, a ROM disc. As an example, a case of the ROM disc that is $\lambda/6n$ (n is a refractive index of the medium) in the pit depth will be described. In this ROM disc, information is recorded by a length of a pit portion delayed in the phase of the reflected light by $2\pi/3$ with respect to a space portion in the periphery. In the normal optical disc device, the return light that has been modulated in intensity by interference of the reflected light of the pit portion with the reflected light of the space portion is detected to reproduce the information. The reproducing method according to this embodiment is different from that in the conventional system, and can be described in the same principle as that in the first embodiment. When it is assumed that the phase of the reflected light from the space portion is 0, and the phase of the reflected light from the pit portion is $-2\pi/3$, the electric field distribution of the reproduced light is illustrated in FIG. 16A. In this example, the phase servo drive is conducted, their electric fields are illustrated in FIG. 16B. A negative value is output as the reproduced signal when the reproduction reference light is irradiated onto the space portion, and a positive value is output as the reproduced signal when the reproduction reference light is irradiated onto the pit portion. As a result, the reproduced signal can be acquired as in the related art.

The recording medium can be configured by a medium that undergoes the phase change in the recorded mark portion, and a write once type or rewriteable type medium enables reproduction in the same manner if the medium undergoes the phase change.

Fifth Embodiment

Figure 17:
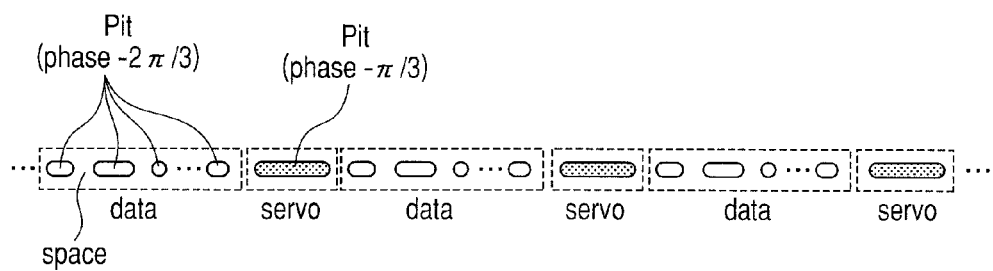
FIG. 17 is a diagram illustrating a recording form of the ROM disc when the phase servo control is conducted by the sample servo system.
Figure 18A:
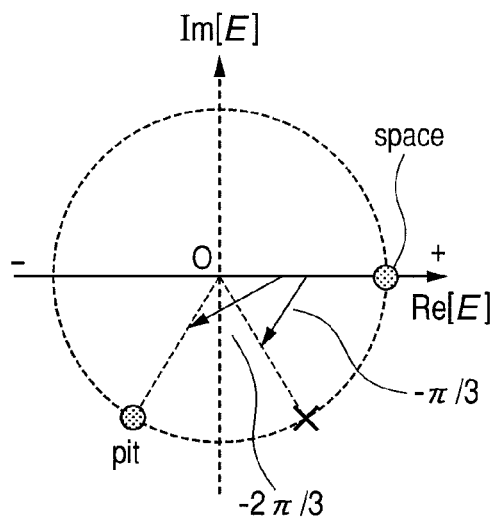
FIGS. 18A and 18B are diagrams each illustrating the electric field complex amplitude distribution of the reproduced light from the ROM disc when the phase servo control is conducted by the sample servo system.
Figure 18B:
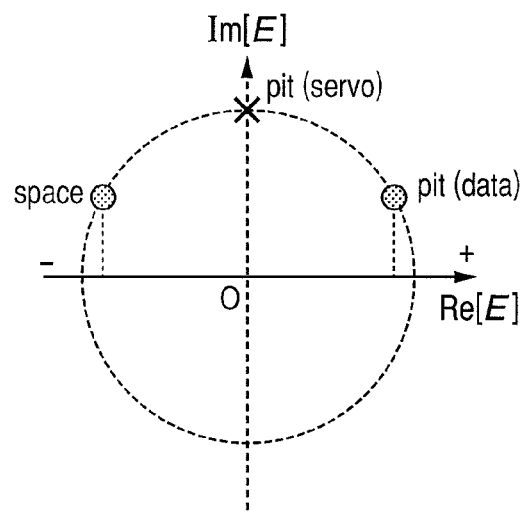

This embodiment is another embodiment that conducts the phase servo control by the sample servo system in the same optical information reproducing apparatus as that of the fourth embodiment. In this case, a recording medium may be the recording medium described in the third embodiment, or may be a ROM disc. In the case of the ROM disc, as in the third embodiment, the ROM disc in which the data regions and the servo regions are alternately repeated as illustrated in FIG. 17. The pit depth of the servo regions is half the pit depth of the data regions, and the optical electric field reflected from each of the spaces, the pits of the data regions, and the pits of the servo regions is represented in FIG. 18A. With the above configuration, the reproduction optical electric field in the state where the phase servo control has been conducted is represented in FIG. 18B, and the reproduced signal can be acquired as in the fourth embodiment (the ROM disc having the above plural kinds of pit depths is disclosed in, for example, JP-A-Sho58(1983)-215735).

According to the present invention, there can be provided the optical information recording/reproducing apparatus that performs both of the high capacity and the high transfer rate, and the wide industrial application such as a high-capacity video recorder, a hard-disc data backup device, and a saved information archive device can be expected.

What is claimed is:

1. An optical information recording/reproducing apparatus in which two optical beams face each other and are focused at substantially the same place of an optical information recording medium to record a standing wave developed by interference of the two optical beams, the apparatus comprising:

an electric field complex amplitude modulation unit configured to modulate an electric field complex amplitude of at least one of the two optical beams;

a first optical path length adjustment unit configured to adjust an optical path length difference of the two optical beams at the focused place;

an interference optical system configured to allow a reproduced light generated by irradiating any one of the two optical beams onto the optical information recording medium to interfere with a reproduction reference light generated from a light source to generate two interference lights different in interference phase by substantially 180 degrees from each other at the same time;

a second optical path length adjustment unit configured to adjust the optical path length difference between the reproduced light and the reproduction reference light; and a phase adjustment unit configured to adjust a phase difference between an average electric field that averaged an electric field by a modulation of the reproduced light and an electric field of the reproduction reference light;

a detector configured to detect an intensity difference between the two interference lights.

2. The optical information recording/reproducing apparatus according to claim 1, wherein modulation by the electric field complex amplitude modulation unit has three values or more.

3. The optical information recording/reproducing apparatus according to claim 1, wherein an average of the electric fields of the optical beams modulated by the electric field complex amplitude modulation unit has a value other than zero, and is different in phase from at least one of the respective electric fields after being modulated.

4. The optical information recording/reproducing apparatus according to claim 1, wherein the electric field complex amplitude modulation unit alternately repeats data recording modulation and servo control signal recording modulation, and wherein the phase adjustment unit adjusts the phase difference according to the reproduced signal of the servo control signal recorded by the servo control signal recording modulation.

5. The optical information recording/reproducing apparatus according to claim 1, wherein the electric field complex amplitude modulation unit comprises a single phase modulation unit.

6. The optical information recording/reproducing apparatus according to claim 1, wherein the first optical path length adjusting unit and the second optical path length adjusting unit comprise the same optical path length adjustment unit.

7. The optical information recording/reproducing apparatus according to claim 5, wherein a range of the phase modulation by the phase modulation unit comprises $\pi$ radians.

8. The optical information recording/reproducing apparatus according to claim 5, wherein a range of the phase modulation by the phase modulation unit comprises less than $\pi$ radians.

* * * * *